United States Patent [19]

Nagatsuka et al.

[11] Patent Number: 5,537,718
[45] Date of Patent: Jul. 23, 1996

[54] METHOD FOR PRODUCTION OF MATERIAL FOR COMPOSITE ARTICLE

[75] Inventors: Yoshihiro Nagatsuka, Tsukuba; Takeshi Kitano, Ushiku, both of Japan

[73] Assignee: Agency of Industrial Science & Technology, Ministry of International Trade & Industry, Tokyo, Japan

[21] Appl. No.: 335,971

[22] Filed: Nov. 3, 1994

Related U.S. Application Data

[63] Continuation of Ser. No. 35,204, Mar. 22, 1993, abandoned.

[30] Foreign Application Priority Data

Mar. 27, 1992 [JP] Japan .................................. 4-101631

[51] Int. Cl.⁶ .............................. B29C 70/12; D04H 1/12; D04H 1/16
[52] U.S. Cl. ............................ 19/302; 19/296; 19/304; 264/112; 264/113; 264/116; 264/126
[58] Field of Search ................................ 156/62.2, 62.4, 156/62.8, 181; 264/112, 113, 115, 116, 121, 122, 126; 19/145, 145.5, 145.7, 161.1, 296, 302, 304, 306, 308

[56] References Cited

U.S. PATENT DOCUMENTS

| | | | |
|---|---|---|---|
| 2,543,101 | 2/1951 | Francis | 264/122 |
| 2,825,389 | 3/1958 | Stephens | 264/116 |
| 2,993,239 | 7/1961 | Heritage | 19/302 |
| 3,158,668 | 11/1964 | Johnson | 264/116 |
| 3,256,569 | 6/1966 | Draving | 19/308 |
| 4,229,397 | 10/1980 | Fukuta et al. | 264/113 |
| 4,410,385 | 10/1983 | Murphy | 156/181 |
| 4,904,439 | 2/1990 | Farrington et al. | 264/113 |
| 5,108,678 | 4/1992 | Hirasaka et al. | 156/62.4 |
| 5,200,128 | 4/1993 | Kiss | 264/112 |
| 5,354,398 | 10/1994 | Kawai | 156/62.8 |

FOREIGN PATENT DOCUMENTS

| | | |
|---|---|---|
| 4-303626 | 10/1992 | Japan . |
| 1200342 | 7/1970 | United Kingdom . |

OTHER PUBLICATIONS

Abstract for JA 4-303626.

*Primary Examiner*—Steven D. Maki
*Attorney, Agent, or Firm*—Oblon, Spivak, McClelland, Maier & Neustadt

[57] ABSTRACT

A method for producing a material for a fiber-reinforced composite article is disclosed which comprises preparing an apparatus composed of a belt and at least one fiber-separating and throwing device, setting the belt in motion and the roller in rotation, feeding a mixture of matrix thermoplastic resin fibers (a) and reinforcing fibers (b) to the roller, causing the roller to separate the fibers and throw the separated, fibers, and allowing the thrown fibers to pile up on the moving belt, thereby giving rise to a mat wherein the ratio of the fibers (a) and (b) successively increases or decreases in the direction of thickness of the mat.

4 Claims, 3 Drawing Sheets

METHOD FOR PRODUCTION OF MATERIAL FOR COMPOSITE ARTICLE

This application is a continuation of application Ser. No. 08/035,204, filed on Mar. 22, 1993, now abandoned.

BACKGROUND OF THE INVENTION

1. Field of the Invention

This invention relates to a method for the production of a material for a composite article and more particularly to a fibrous material for a composite article which comprises a matrix of thermoplastic resin fibers and reinforcing fibers and contains the component fibers in such a manner that the mixing ratio thereof varies in the direction of thickness of the material.

2. Prior Art Statement

Various methods for the production of a fiber-reinforced composite article have heretofore been proposed and put into practical use. The present inventors also have proposed methods for producing such a fiber-reinforcing composite article by mixing reinforcing fibers with a powdery or granular thermoplastic resin and thermally molding the resultant mixture (Japanese Patent Publication No. 33148/1976 and Japanese Unexamined Patent Public Disclosure No. 303626/1992).

These methods share a procedure of uniformly mixing a matrix material with reinforcing fibers and molding the resultant mixture but do not specify the distribution of the mixing ratio of the components in the direction of thickness of the composite article. To date, various kinds of fiber-reinforced composite articles have found utility in numerous applications. In particular, there has been increasing demand for the fiber-reinforced composite articles in which the ratio of the components varies in the direction of thickness. This invention pertains to a method for the production of a material for a composite article which responds to this demand.

SUMMARY OF THE INVENTION

One aspect of this invention is directed to a method for the production of a material for a composite article in the form of a mat wherein the ratio of the components thereof varies in the direction of thickness, which method comprises preparing an apparatus composed of a belt and a plurality of rollers arranged along the belt and adapted to separate and throw fibers, keeping the belt in motion and the rollers in rotation, and simultaneously supplying to each roller a mixture of (a) thermoplastic resin fibers for a matrix and (b) reinforcing fibers with the mixing ratio of the components (a) and (b) increased or decreased for successive rollers thereby allowing the separated fibers to pile up on the belt and giving rise to a mat wherein the ratio of the components (a) and (b) varies in the direction of thickness. Another aspect of the invention is directed to a method for the production of a material for a composite article in the form of a mat wherein the ratio of the components thereof varies in the direction of thickness, which method comprises preparing a device composed of a belt and a roller adapted to separate and throw fibers, keeping the belt in motion and the roller in rotation and simultaneously supplying to the roller a mixture of (a) thermoplastic resin fibers for a matrix and (b) reinforcing fibers and allowing the separated fibers to pile up on the belt, thereby giving rise to a mat wherein the ratio of the components (a) and (b) varies in the direction of thickness.

The above and other features of the invention will become apparent from the following description made with reference to the accompanying drawings.

DESCRIPTION OF THE PREFERRED EMBODIMENT

The first method of this invention will now be described. This is the most general method of the present invention. This method essentially comprises supplying a mixture of a plurality of different types of fibers including reinforcing fibers and thermoplastic resin fibers for a matrix to each of a plurality of fiber-separating and throwing devices, causing the fibers of the mixtures to be separated and thrown, and enabling the thrown fibers to collect and pile up on a moving belt, thereby forming a mat. In the mixtures of different types of fibers supplied to the plurality of fiber-separating and throwing devices, the percentage of at least one type of fiber is successively increased or decreased in the direction in which the plurality of fiber-separating and throwing devices are arranged in series parallelly to the direction of motion of the belt. The different mixtures are therefore superposed in the form of a laminate on the moving belt. As a result, a material for a fiber-reinforced composite article wherein the mixing ratio of the component fibers gradually changes in the direction of thickness of the mat can be produced.

The second method contemplated by this invention will now be described. This method is effective particularly when a plurality of types of fibers exhibit markedly different behaviors when thrown. Further, it fulfills the object of the invention using only a single fiber-separating and throwing device.

In the operation of this method, since heavy fibers are thrown a long distance and light fibers a short distance, the layers in which these heavy and light fibers are piled on the belt are different. By this method, therefore, there can be obtained a material for a fiber-reinforced composite article wherein the mixing ratio of the different types of fibers gradually varies in the direction of thickness of the mat which piles up on the belt.

This invention will now be described more specifically with reference to the drawings.

Figure 1:
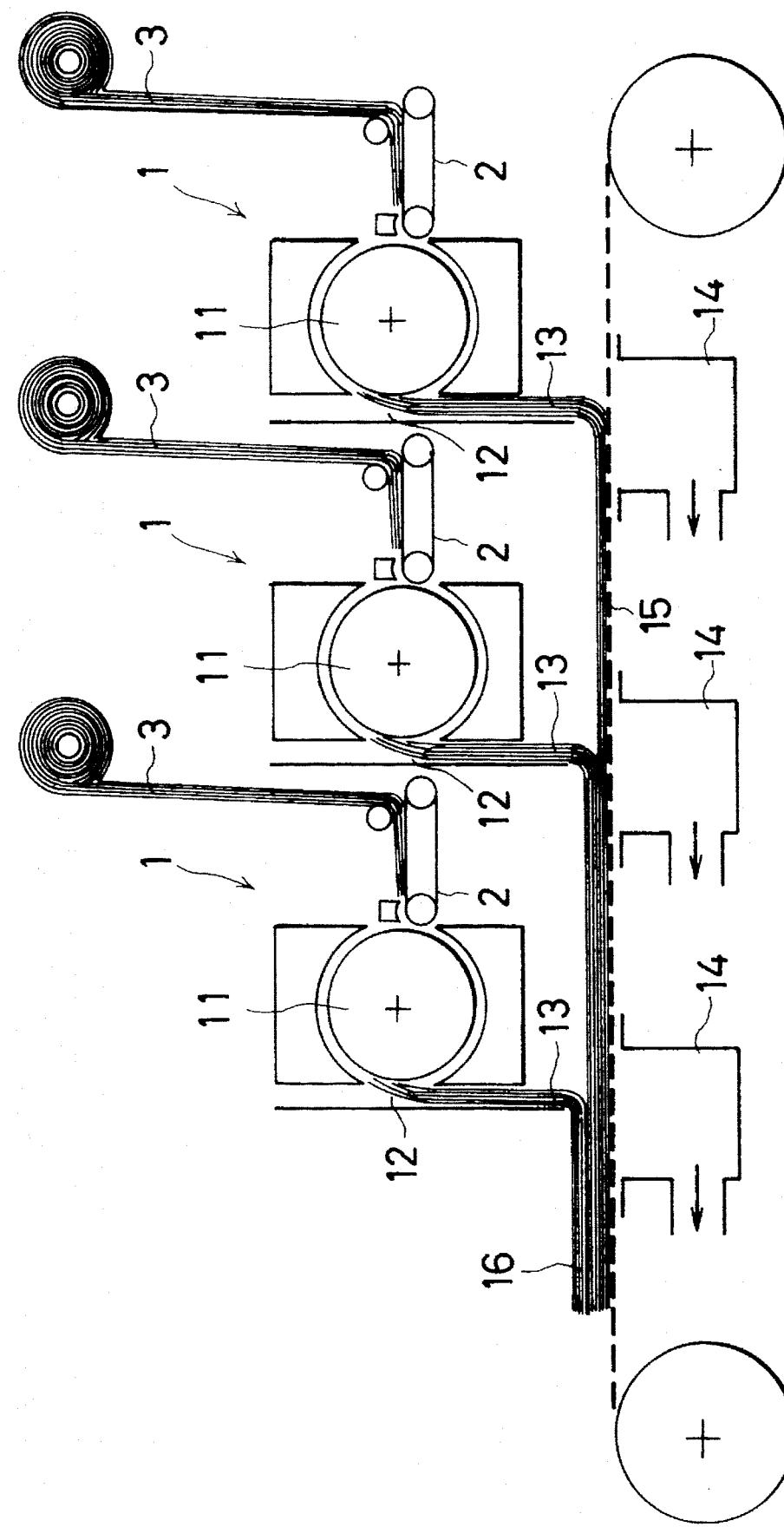
FIG. 1 is a diagram illustrating the structure of an apparatus for working the first method contemplated by this invention.

FIG. 1 shows the structure of an apparatus for use in working the first method of this invention.

This apparatus has a belt 15 for allowing thrown fibers to pile up thereon and a plurality of fiber-separating and throwing devices 1 disposed along the direction of motion of the belt 15.

In each device 1 in the diagram, 2 designates a conveyor for supplying a mixture 3 of a plurality of different types of fibers and 11 a roller provided on the periphery thereof with implanted needles for separating fibers and adapted to be rotated at a speed high enough to throw the separated fibers. The fibers which have been separated and thrown by the roller 11 are entrained by a current of air through a path 12. This path 12 has an opening above the belt 15.

The belt 15 is porous and pervious to air. The fibers 13 are thoroughly separated and then thrown into the paths 12 by the high-speed rotation of the rollers 11. They are then entrained by a current of air produced in the paths 12 by suction of air through suction ducts 14 located below the belt 15. When they reach the moving belt 15, they pile up thereon in the form of a mat 16 made up of a mixture of a plurality of types of fibers.

The fibers which can be used in the method described above include glass fibers, carbon fibers and aramid fibers as reinforcing fibers, and polyamide (Nylon 6), polypropylene, polyethylene and polyethylene terephthalate as matrix fibers, for example.

The glass fibers and carbon fibers which are capable of being cut by the fiber-separating and throwing rollers 11 can be supplied in the form of continuous threads, whereas the aramid fibers which are incapable of being cut by the fiber-separating and throwing rollers 11 are supplied in the form of precut threads. By the same token, those matrix fibers which are capable of being cut with the fiber-separating and throwing rollers are supplied in the form of continuous threads and those which are difficult to cut are supplied in the form of precut threads.

Figure 2:
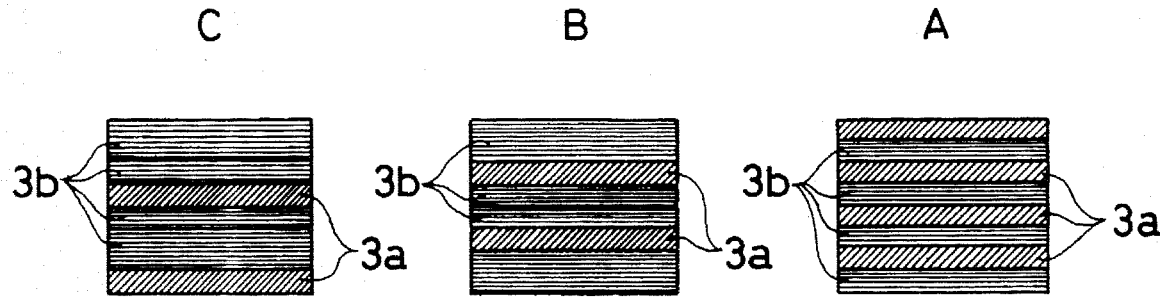
FIG. 2 is a diagram illustrating examples of the mixing ratio of components of a fibrous mixture supplied to each of the rollers in the apparatus of FIG. 1 for working the method of this invention.
Figure 4:
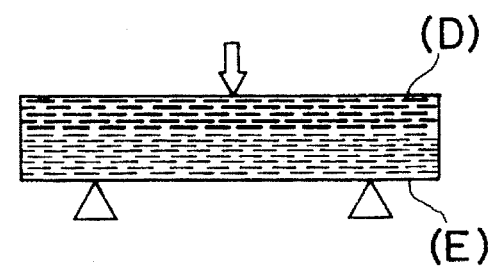
FIG. 4 is a diagram illustrating examples of the manner in which a load is exerted on the material for a composite article produced by the method of this invention.
Figure 4:
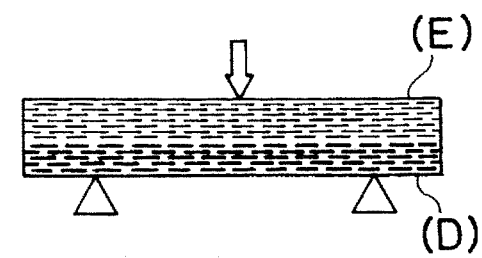

In the mixtures 3 of different types of fibers which are supplied to the fiber-separating and throwing devices 1 in the method of this invention, the percentage of at least one type of fiber is required to be successively increased or decreased. When mixtures each consisting of one type of reinforcing fiber 3a and one type of matrix thermoplastic resin fiber 3b are supplied to the fiber-separating and throwing rollers 11, the mixtures 3 supplied to the plurality (three in the embodiment of FIG. 1) of fiber-separating and throwing rollers are such that the percentage of reinforcing fibers 3a contained therein is successively decreased as illustrated schematically in FIGS. 2A to C. In this case, the percentage of matrix thermoplastic resin fibers 3b in the mixture increases successively from A to B to C. In the apparatus of this embodiment, the plurality of fiber-separating and throwing devices are required to be arranged in such a manner that mats of layer combinations A to C will occur in the order mentioned.

When fiber mixtures 3 are separated and thrown by the action of the fiber-separating and throwing rollers 11, which are rotated at a high speed (roller diameter 20 mm and revolution number 2,000 to 5,000 rpm, for example), the thrown fibers pile up in the form of superposed layers on the moving belt and eventually collect in the form of a mat of mixture of a plurality of types of fibers. As a result, a material for a fiber-reinforced composite article wherein the ratio of component fibers successively varies in the direction of thickness can be obtained.

Figure 3:
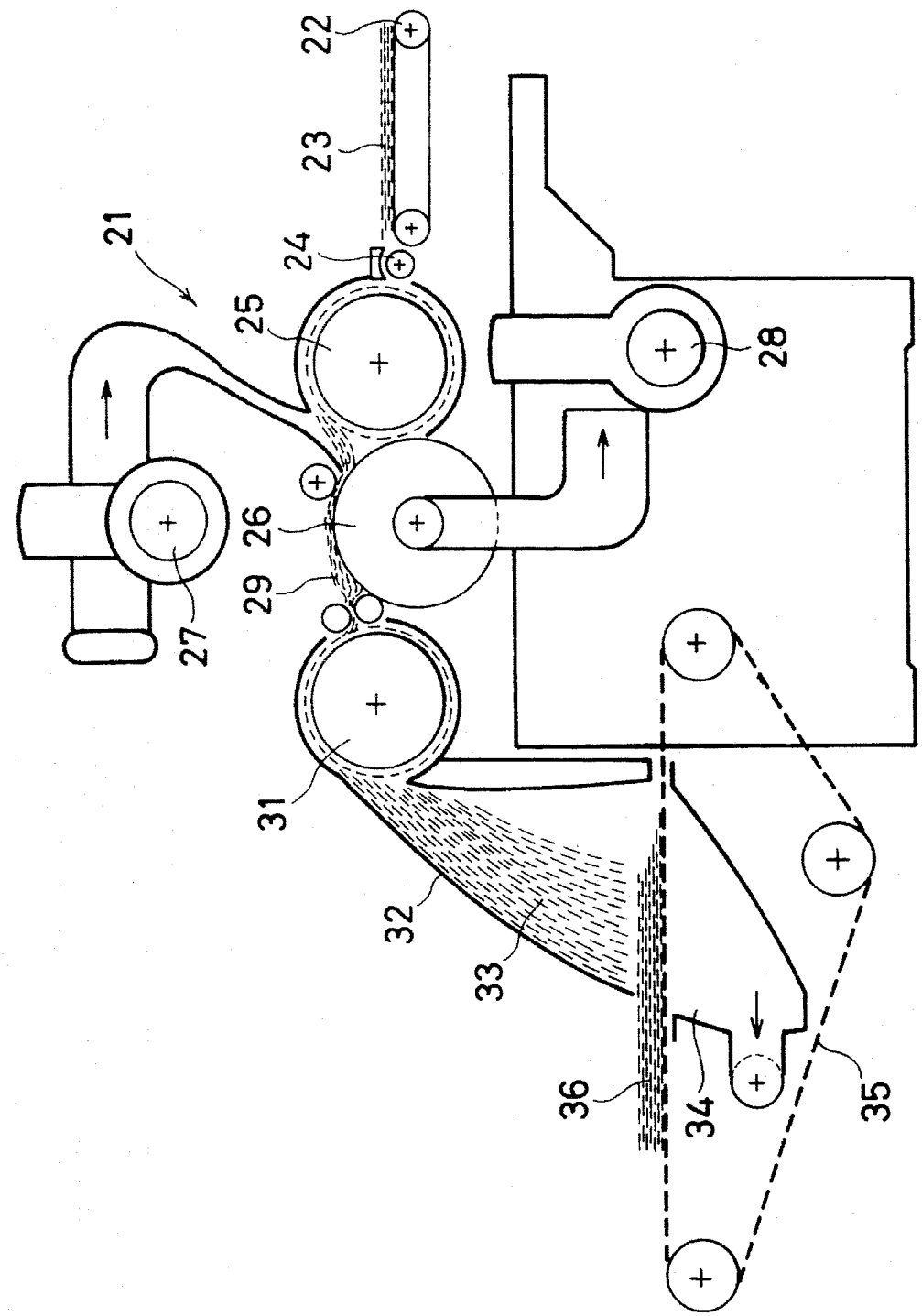
FIG. 3 is a diagram illustrating the structure of an apparatus for working the second method contemplated by this invention.

FIG. 3 shows the structure of an apparatus to be used for working the second method of this invention.

As illustrated in the diagram, a fiber-separating and throwing device 21 is provided with a supply conveyor 22 for supplying a mixture 23 of reinforcing fibers and matrix fibers and a supply roller 24 for guiding the mixture 23 of fibers to the inlet of a preparatory fiber-separating and throwing roller 25. The mixture 23 of fibers supplied is cut, separated, and thrown by the preparatory fiber-separating and throwing roller 25 and also by a fiber-separating and throwing roller 31 downstream thereof.

Similarly to the rollers of the embodiment shown in FIG. 1, the preparatory fiber-separating and throwing roller 25 is provided with implanted needles. The fiber-separating and throwing roller 25 is rotated at high speed so as to cut separate and throw the fiber mixture 3 supplied thereto. The thrown fibers are subjected to the action of an accelerating blower 27 and, at the same time, to the action of suction generated by a discharge blower 28 and consequently piled up on a porous cage roller 26 to give rise to a web 29 of a substantially uniform mixture of the component types of fibers. The discharge blower 28 is adapted to expel air from the porous cage roller 26 to lower the inner pressure thereof and suck the thrown fibers onto the surface of the cage roller 26. Since the cage roller 26 is slowly rotated by a drive device, the web 29 deposited on the cage roller 26 is gradually supplied to the fiber-separating and throwing roller 31.

The fiber-separating and throwing roller 31 is similar in construction to the preparatory fiber-separating and throwing roller 25 explained above. The web 29 of fibers supplied to the fiber-separating and throwing roller 31 are separated and thrown in a substantially discrete state in the same manner as described above, with the result that the thrown fibers are released to follow a trajectory 32. In the trajectory 32, the fibers become propelled fibers 33. The propelled fibers 33 are made up of a plurality of types of fibers as described above. The distance of flight of these fibers therefore differs with the characteristics of the fibers.

The propelled fibers 33 fly in a current of air generated within the trajectory 32 by a suction duct 34 and then pile up on a moving belt 35 which constitutes a fiber-collector at the end of the trajectory 32. The fibers consequently collect in the form of a mat 36.

In this mat 36, the proportion of fibers of a specific type successively increases (while the proportion of fibers of the other type successively decreases). In working the method under discussion, use of a plurality of types of fibers differing in flight characteristics is an important requirement.

As regards the plurality of types of fibers which are different in flight characteristics, as for the reinforcing fibers there can be used, for example, glass fibers, carbon fibers and aramid fibers. Fibers made of one and the same substance but differing in thickness, length, or an attribute such as surface treatment are thrown by the fiber-separating and throwing roller 31 to different distances.

As matrix fibers, polyamide (Nylon 6), polypropylene, polyethylene and polyethylene terephthalate may be used. These matrix fibers similarly have different flight distances depending on the attributes of thickness, length, and surface treatment.

In the diagram showing the method described above, the supply roller represented by 22 functions to transfer the mixture 23 of fibers to the fiber-separating and throwing roller 25.

Though the invention does not particularly define the specifications of the fiber-separating and throwing rollers 25 and 31 used herein, it is generally preferable to use rollers measuring approximately 20 mm in diameter and operating at a speed in the range of from 2,000 to 5,000 rpm.

In the method of this invention, when the mixture 33 of a plurality of types of fibers different in flight characteristics is separated and thrown by the fiber-separating and throwing roller 31, the heavy fibers fly a long distance and the light fibers a short distance from the fiber-separating and throwing roller 31, because the flight distance of these fibers differs depending on their characteristics.

As a result, the fibers that fly a long distance form an upper layer and the fibers that fly a small distance form a lower layer of the mat 36. Thus, the ratio of these fibers differs in the direction of thickness of the mat. In the material for a fiber-reinforced composite article consequently produced, the ratio of these fibers successively increases or decreases in the thickness direction of the material.

The material for the fiber-reinforced composite article is enabled to acquire suitable strength by properly changing the kinds of matrix fibers and reinforcing fibers. The possibility of the matrix fibers and the reinforcing fibers used in the mat separating from each other is nil.

Now, working examples in which shaped articles made of the materials produced by the method of this invention for fiber-reinforced composite articles were tested for properties will be set out below.

EXPERIMENT

A plurality of sample mats were produced with mixtures consisting of carbon fibers as reinforcing fibers and nylon resin fibers as matrix fibers and having carbon fiber contents varied as indicated in Table 1. Each sample mat was placed in a 15-cm square metallic frame and hot-pressed at a pressure of 50 kg/cm$^2$ and a temperature of 240° C. to produce a shaped article having a thickness of 3 mm. The shaped articles consequently obtained were subjected to a three-point bending test. The results are shown in Table 1.

TABLE 1

| Sample No. | Carbon fiber content (wt %) | Bending modulus (kgf/cm$^2$) | Bending strength (kgf/cm$^2$) | Bending strain (%) |
|---|---|---|---|---|
| 1 | 9.65 | 543.78 | 7.866 | 2.043 |
| 2 | 15.02 | 740.56 | 13.684 | 2.182 |
| 3 | 19.26 | 1049.8 | 18.128 | 1.855 |
| 4 | 25.92 | 1203.3 | 19.877 | 1.818 |

EXAMPLE

An experiment was carried out on the first method of this invention as follows.

A belt was laid out and four fiber-separating and throwing rollers were disposed along the direction of travel of the belt. Mixtures of fibers similar in composition to the sample mats used in the experiment described above were supplied to the rollers. To be more specific, a mixture identical in composition with Sample No. 1 was supplied to the first roller and mixtures identical in composition with the Sample Nos. 2, 3 and 4 were supplied to the second, third, and fourth rollers. The belt and the rollers were driven to produce a mat.

The mat was placed in a 15-cm square metallic frame and hot-pressed in the same manner as in the Experiment to produce a shaped article of the same thickness. It was plain by observation that in the shaped article so obtained, the content of carbon fibers was larger at one surface (D) than at the other surface (E).

This shaped article was subjected to a three-point bending test in the same manner as in the Experiment. In the bending test, the load was exerted on the surface (D) having the larger carbon fiber content in one test run and on the other surface (E) having the smaller carbon fiber content in the other test run.

The results are shown in Table 2.

TABLE 2

| Side loaded | Carbon fiber content (wt %) | Bending modulus (kgf/cm$^2$) | Bending strength (kgf/cm$^2$) | Bending strain (%) |
|---|---|---|---|---|
| D | Large | 1165.1 | 22.330 | 2.179 |
| E | Small | 1131.2 | 18.848 | 1.782 |

The following fact can be deduced from this table.

In the shaped article produced by the method of this invention, the proportion of reinforcing fibers successively increased in the direction from the (D) surface to the (E) surface, namely the content of carbon fibers successively decreased in the direction of thickness of the shaped article.

As a result, the shaped article manifested the following characteristics.

Though the surface (D) had the same composition as Sample No. 4 in the Experiment, it exhibited a larger bending strength than Sample No. 4. The surface (E), which had the same composition as Sample No. 1 of the Experiment, exhibited a larger bending strength. The surfaces (D) and (E) both were substantially equal in bending modulus to Sample No. 4. Thus, it is clear that for the same fibers used in the same amounts, the shaped article manifested greater strength than the shaped article having a substantially uniform mixing ratio of fibers.

Another property of the material contemplated by this invention is that its thermal conductivity varies with the reinforcing fiber content thereof. The material produced by the method of this invention can be utilized in applications which make use of this fact.

What is claimed is:

1. A method for producing a mat for a composite article, said method comprising the steps of:

supplying a mixture of thermoplastic resin fibers and reinforcing fibers to a first roller while said first roller is in rotation, wherein said first roller separates and throws the mixture of thermoplastic resin fibers and reinforcing fibers to a porous intermediate roller while said intermediate roller is in rotation;

applying a suction force to said intermediate roller for decreasing an inner pressure in said intermediate roller to form a web on said intermediate roller which has a substantially uniform mixture; and supplying said web to a second roller while said second roller is in rotation, wherein said second roller separates and throws said thermoplastic resin fibers and reinforcing fibers to a belt while said belt is moving for permitting the separated fibers to pile up on said belt and form a mat on said belt having a ratio of components of said mixture which varies in a thickness direction of said mat.

2. A method according to claim 1, wherein said thermoplastic resin fibers and said reinforcing fibers are different in weight so that heavy fibers which are thrown by said second roller onto said belt fly a longer distance than lighter fibers which are thrown by said second roller, and said heavy fibers that are thrown a longer distance form an upper layer of said mat and said lighter fibers which are thrown a shorter distance form a lower layer of said mat.

3. A method according to claim 1, wherein said thermoplastic resin fibers is at least one of polyamide polypropylene, polyethylene and polyethylene terephthalate fibers.

4. A method according to claim 1, wherein said reinforcing fibers is at least one of glass, carbon and aramid fibers.

* * * * *